United States Patent
Parkinson

(10) Patent No.: US 12,420,490 B2
(45) Date of Patent: Sep. 23, 2025

(54) SPLIT BUS ASSEMBLY FOR HEAT-SEAL TOOL

(71) Applicant: Force Global—ROPEX America LLC, Germantown, WI (US)

(72) Inventor: Michael Parkinson, Hubertus, WI (US)

(73) Assignee: Force Global—ROPEX America LLC, Germantown, WI (US)

( * ) Notice: Subject to any disclaimer, the term of this patent is extended or adjusted under 35 U.S.C. 154(b) by 158 days.

(21) Appl. No.: 18/390,665

(22) Filed: Dec. 20, 2023

(65) Prior Publication Data

US 2024/0293976 A1  Sep. 5, 2024

Related U.S. Application Data

(60) Provisional application No. 63/449,424, filed on Mar. 2, 2023.

(51) Int. Cl.
| | |
|---|---|
| *B29C 65/30* | (2006.01) |
| *H02G 5/10* | (2006.01) |
| *H05B 3/08* | (2006.01) |

(52) U.S. Cl.
CPC ............ *B29C 65/30* (2013.01); *H02G 5/10* (2013.01); *H05B 3/08* (2013.01)

(58) Field of Classification Search
CPC ....... B29C 65/30; B29C 65/38; B29C 65/224; B29C 65/228; B29C 66/81811; B29C 66/81871; H02G 5/10; H05B 3/08

USPC ...................................................... 156/583.1
See application file for complete search history.

(56) References Cited

U.S. PATENT DOCUMENTS

| | | | |
|---|---|---|---|
| 3,069,303 A | 12/1962 | Scholle | |
| 3,369,954 A | 2/1968 | Fener | |
| 3,425,887 A | 2/1969 | Bowen | |
| 11,673,348 B1 * | 6/2023 | Viator | ................. B65D 88/54 156/64 |

OTHER PUBLICATIONS

EP Search Report dated Jul. 2, 2024 from EP App. No. 23219536.2 (6 pages).

* cited by examiner

*Primary Examiner* — James D Sells
(74) *Attorney, Agent, or Firm* — Boyle Fredrickson, S.C.

(57) ABSTRACT

A split bus assembly is provided for a heat-sealing machine. The split bus assembly includes a clamp with first and second clamp segments that abut each other in face-to-face engagement. The engaging surfaces or inner walls of the clamp segments may be coated with a nonconductive material so that the clamp segments are electrically insulated with respect to each other. A tab terminal may be defined at each inner wall, constituting a zone of exposed conductive material which is configured to engage a conductive tab of a heat-seal band during use. Biasing members such as a silicone spring may be arranged in the tool to facilitate ejection of the heat-seal band during a removal procedure. The tool may be cooled by way of cooling fluid that flows through passages in the bus bars.

15 Claims, 8 Drawing Sheets

SPLIT BUS ASSEMBLY FOR HEAT-SEAL TOOL

CROSS REFERENCE TO RELATED APPLICATION

This application claims the benefit of U.S. provisional application No. 63/449,424 filed Mar. 2, 2023 and hereby incorporated by reference.

FIELD OF THE INVENTION

The invention relates generally to heat-sealing and, in particular, to a split bus assembly for a heat-seal tool of a heat-sealing machine.

BACKGROUND OF THE INVENTION

In heat-sealing or welding of thermoplastic materials, achieving uniform heat distribution about a contoured heat-seal surface presents numerous challenges. This is especially true for heat-sealing procedures that implement closed-perimeter or closed-contour heat-seal bands. That is because closed-contour bands typically require conductive features, such as various terminal tabs, that connect to the bands at tab to band (tab/band) junctions for transmitting electrical current into and out of the bands. Characteristics of the tabs and the bands, as well as aspects of their engagement at the tab/band junction, influence how electrical and thermal energy will flow through the transition(s) at the tab/band junction. Variation in these characteristics can lead to unbalanced energy transfer and nonuniform heating of the bands, especially at, or adjacent to, the tab/band junction.

Control methodologies for some closed-contour heat-seal bands, such as those implemented in impulse heat-sealing procedures, involve a heat-sealing procedure that can require cyclic heating and cooling phases. Many impulse heat-sealing procedures allow the heat-seal or weld to cool, at least to some extent, while the workpiece's components are held under pressure. This is typically done by passive-type cooling in which the heat seal band is deenergized and its temperature is correspondingly reduced.

Numerous other system factors will influence the thermal characteristics of the contour or band and, correspondingly, the characteristics of the weld or heat-seal of the workpiece. For example, characteristics of the heat seal tool that holds the heat-seal band can influence energy transfer through the heat seal band. Typically, heat-seal tools are complicated assemblages of numerous components. Some heat-seal tool components are made from insulative materials and others are made from conductive materials. These components, with different material compositions and masses, are combined to create a complex assemblage that may provide multiple joints at a backing surface that will support the band. This complex assemblage can result in non-uniformity of surfaces and material characteristics, which can lead to uneven energy transfer through the heat-seal band.

Managing these various challenges of heat-seal tools to try maintaining suitable uniformity of heat distribution about heat-sealed surfaces has proven difficult.

SUMMARY OF THE INVENTION

In accordance with a first aspect of the invention, a heat-seal tool is defined by a two-component split bus bar.

In accordance with another aspect of the invention, a two-part tool is provided with a pair of bus blocks or bus bars that incorporate two bus terminals, such as terminal A and terminal B, that are electrically insulated from one another. Terminals A and B may provide AC or DC power to the heat-seal band terminals. Terminals A and B are opposed (electrically conductive to electrically insulated) in order to deliver power to the corresponding heat-seal band electrical tab, and so as not to create a short circuit between terminals A and B.

In accordance with another aspect of the invention, a split bus assembly is provided including an opposing temperature system that provides both active heating and active cooling for that can be used during different operational phases or both during the same operational phase. The opposing temperature system may provide a cooling phase in which a workpiece is cooled while held under pressure to establish the weld or heat-seal. The opposing temperature system may further provide an opposing system temperature characteristic in which the tool may be actively cooled with a cooling fluid while the heat-seal band that is held in the tool is actively heated, which may enhance control resolution or otherwise enhance control uniformity.

In accordance with another aspect of the invention, a split body impulse heat-seal band tool is provided that may include a liquid cooled electrical bus assembly, for open and closed contoured heat-seal bands.

In accordance with another aspect of the invention, an electrically non-conductive fluid as a gas or liquid (temp controlled) is provided that flows between/through terminals A and B.

In accordance with another aspect of the invention, an electrically conductive fluid, as a gas or liquid (temp controlled), is provided that may only flow through terminal A.

In accordance with another aspect of the invention, an electrically conductive fluid, as a gas or liquid (temp controlled), is provided that may only flow through terminal B.

In accordance with another aspect of the invention, the tool or electrical bus-assembly may include cooling channels. The cooling channels ensure the tool or electrical bus-assembly remains at a constant temperature as power is passed from the tool or electrical bus-assembly to the heat-seal band.

In accordance with another aspect of the invention, the mass of the tool or electrical bus-assembly ensures the contoured heat-seal band maintains a uniform temperature. The cooling load opposes the heat load and creates a more dynamic delivery of energy about the heating surface.

In accordance with another aspect of the invention, a PTFE coated fabric layer may be arranged between the tool body and the heat-seal band, which may increase the tape/buffer thickness to reduce thermal dynamics and increase the thermal homogeneous distribution.

In accordance with another aspect of the invention, each bus bar is made from an electrically and thermally conductive material, such as aluminum. However, such conductive material is exposed only at certain conductive zones. The aluminum bus bars may be hard anodized with a hard non-metallic coating over the aluminum except for conductive zones, such as exposed conductive segments, that act as electrical contacts. This may be done by hard anodizing each bus bar and machining away the hard anodized surface material to expose the underlying conductive material to define electrical contacts that can engage conductive tabs of the heat-seal band, when installed in the heat-seal tool.

In accordance with another aspect of the invention, biasing members such as springs, which may be implemented as non-conductive springs such as silicone springs or other elastomeric structures that can provide biasing forces, are arranged within the tool. The silicone springs may engage portions of the heat-seal band to eject the heat-seal band from the tool during a heat-seal band removal procedure.

These and other features and aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the scope of the invention.

Figure 1:
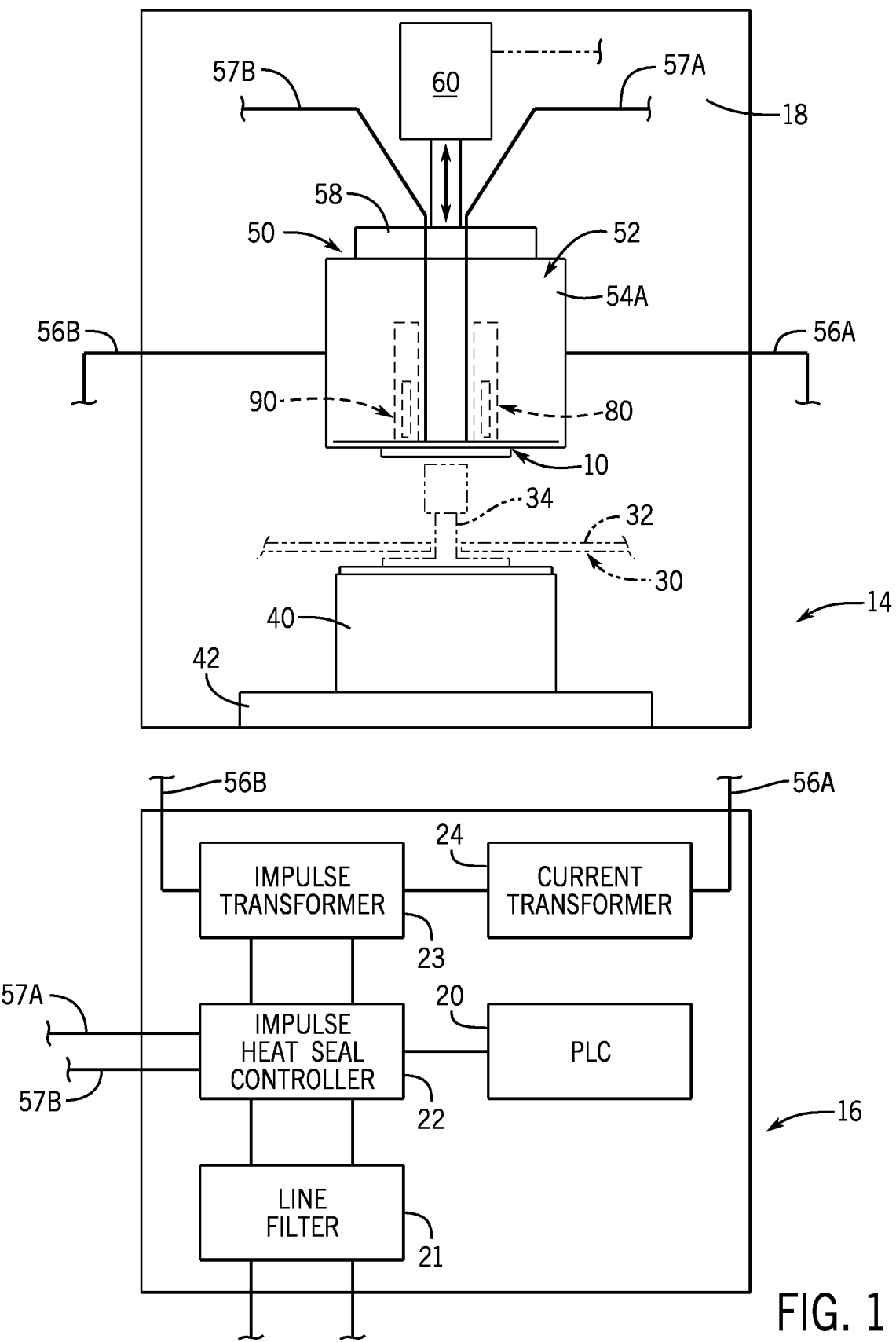
FIG. 1 is a partially schematic view of a heat-sealing system implementing a heat-seal tool in accordance with various aspects of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 2:
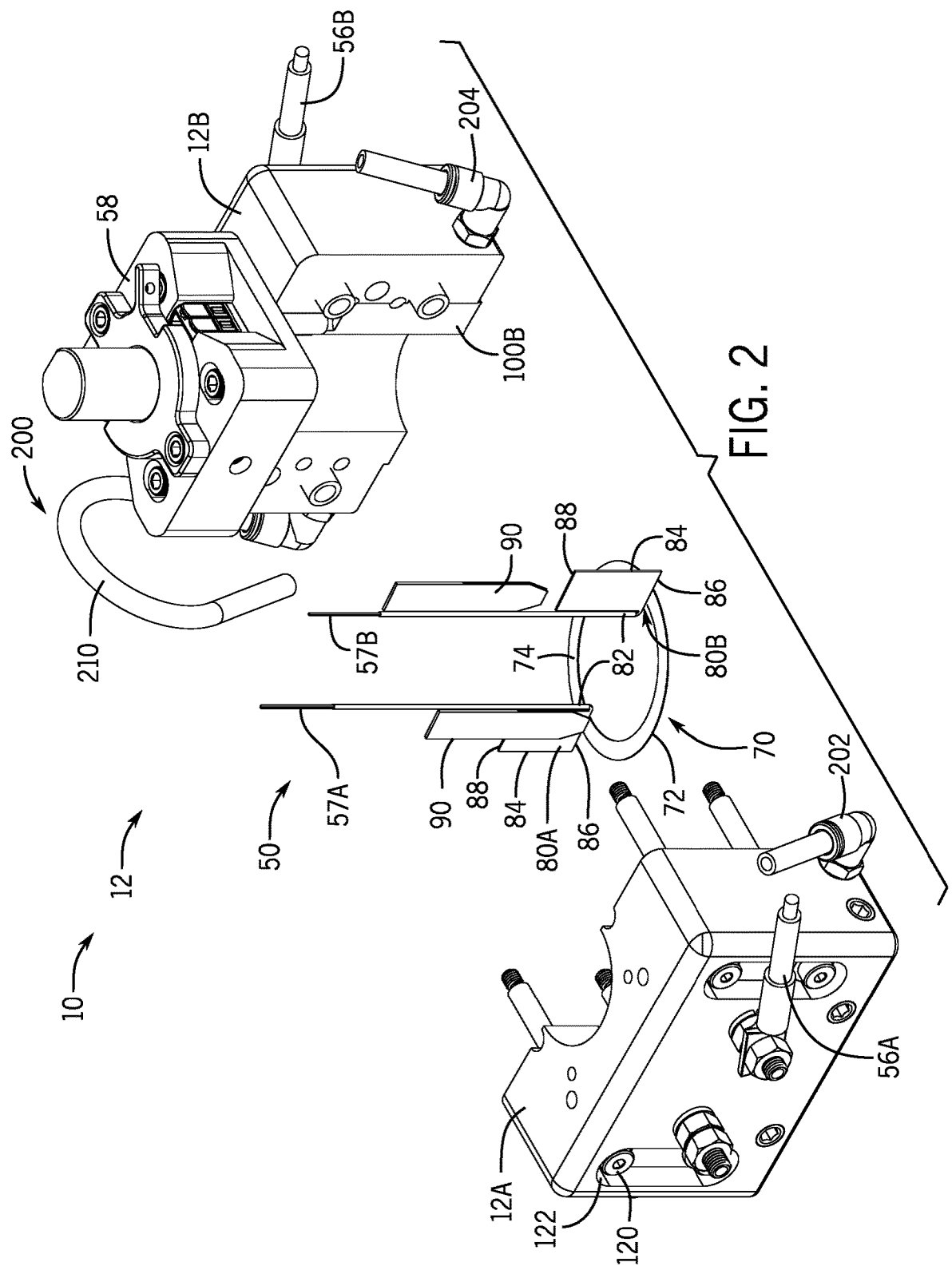
FIG. 2 is a partially exploded isometric view of a heat-seal tool in an accordance with various aspects of the invention.

Referring now to the drawings and initially to FIG. 1, a heat-seal tool 10 is provided with a split bus configuration, shown here as a two-piece heat-seal tool 10 with a clamp(s) shown as a bus bar assembly 12 that has multiple clamp segments at least some of which may be implemented as bus blocks, shown as clamp segments or bus bars 12A, 12B (FIG. 2). Heat-seal tool 10 is shown being used with a thermal joining or welding system to perform a heat-sealing operation, represented here as an impulse heat-seal system 14 that includes a control system 16 and a heat-seal machine 18, in which the heat-seal tool 10 is implemented. Control system 16 includes a controller 20 that is typically implemented as a PLC (programmable logic controller) a microcontroller, or some other computer that executes various stored programs while receiving inputs from and sending commands to the subsystems of components of the impulse heat-seal system 14. Control system 16 includes various power source systems and components, such as a line filter 21, an impulse heat seal controller 22, an impulse transformer 23, and a current transformer 24 for delivering electrical power to various components of the impulse heat-seal system 14.

Still referring to FIG. 1, heat seal machine 18 is configured to perform a thermal joinder procedure such as heat sealing or welding on a workpiece 30, which typically includes multiple workpiece components. Workpiece 30 is shown here with a sheet-like substrate 32 that may, for example, be a segment of a bag or other polymeric or foil enclosure. A discrete component, shown as a fitting 34 that is represented here as having a port-like configuration, is being joined to the substrate 32 of workpiece 30 in this example. Workpiece 30 is shown to be supported from below by a counter-tool 40 that is connected to a counter holder or plate 42, which is supported by a frame of the heat seal machine 18.

Still referring to FIG. 1, heat-sealing tool 10 may be an impulse heat-sealing tool that holds a heat seal band 50 by clamping it between the bus bars 12A, 12B, only one which is visible in this view. Load lines or conductors 56A, 56B connect the bus bars 12A, 12B (FIG. 2) to control system 16, shown here connected to the impulse and current transformers 23, 24. Signal wires or voltage sensing conductors 57A, 57B are connected to control system 16, shown here connected to the impulse heat seal controller 22. Toward the top of the impulse heat-sealing tool 10, an insulated tie plate 58 connects the bus bar assembly 12 halves or bus bars 12A, 12B (FIG. 2) to each other. An actuator 60 connects to a mount of the tie plate 58 and drives the heat-sealing tool 50 into reciprocation between a released or extended position (shown), in which the workpiece's 30 components can be arranged before their heat-sealing; and an engaged or extended position (not shown), in which the heat-sealing tool 10 is moved downwardly to apply pressure and heat from the heat seal band 50 to the workpiece 30 to perform the heat-sealing procedure. Typically, during the heat-sealing procedure, the heat-sealing tool 10 holds the workpiece 30 under pressure against the counter-tool 40 and allows the weldment to cool under pressure to form the weld or heat-seal.

Referring now to FIG. 2, the heat-seal band 50 includes a band 70, shown here with a circular or ring-shaped closed-perimeter or closed-contour configuration. Band 70 has a lower or workpiece-facing surface 72 that is configured to direct heat toward the workpiece 30 (FIG. 3) to perform the heat-sealing operation. An opposite upper or tab-facing surface 74 faces upwardly toward the bus bar assembly 12.

Still referring to FIG. 2, heat seal band 50 receives and transmits electrical current through the bus bars 12A, 12B by way of a conductive tab arrangement 80 (FIG. 1), shown here as a pair of conductive tabs 80A, 80B. The tabs 80A, 80B are generally planar structures that are parallel to and coplanar with each other, extending perpendicularly upward from the band's tab-facing surface 74. Tabs 80A, 80B are shown with lateral upright inner and outer side edges 82, 84 of the tabs 80A, 80B arranged inwardly and outwardly beyond respective inner and outer circumferential edges of the band. A bottom edge 86 is arranged toward the band 70, sitting against the tab-facing surface 74. An upper edge 88 is arranged opposite the band 70. A tab cover system may be implemented as various structures configured to engage the tabs, show here as interchangeable gap gauges 90 that may be selectively seated upon or mounted to the tabs 80A, 80B to influence energy transmission characteristics through a tab to band (tab/band) junction between the tabs 80A, 80B and band 70.

Still referring to FIG. 2, each of the bus bars 12A, 12B has interconnected walls that are coated with a hard anodized nonconductive material. Accordingly, the exterior surfaces of the bus bars 12A, 12B are substantially nonconductive. This allows the bus bars 12A, 12B to engage each other, face-to-face at an abutment joint, and remain nonconductive or electrically insulated from each other. Electrical terminals shown as tab terminals 100A (not shown in FIG. 2), 100B are defined by surfaces of the bus bar 12A, 12B that are non-anodized or exposed aluminum, or other conductive material, from which the bus bars 12A, 12B are made. The tab terminals 100A, 100B are defined zones of exposed conductive material on the otherwise non-conductive surface(s) of the bus bars 12A, 12B. The tab terminals 100A, 100B are arranged to engage the tabs 80A, 80B for transmitting load current through the heat-seal band 50.

Figure 3:
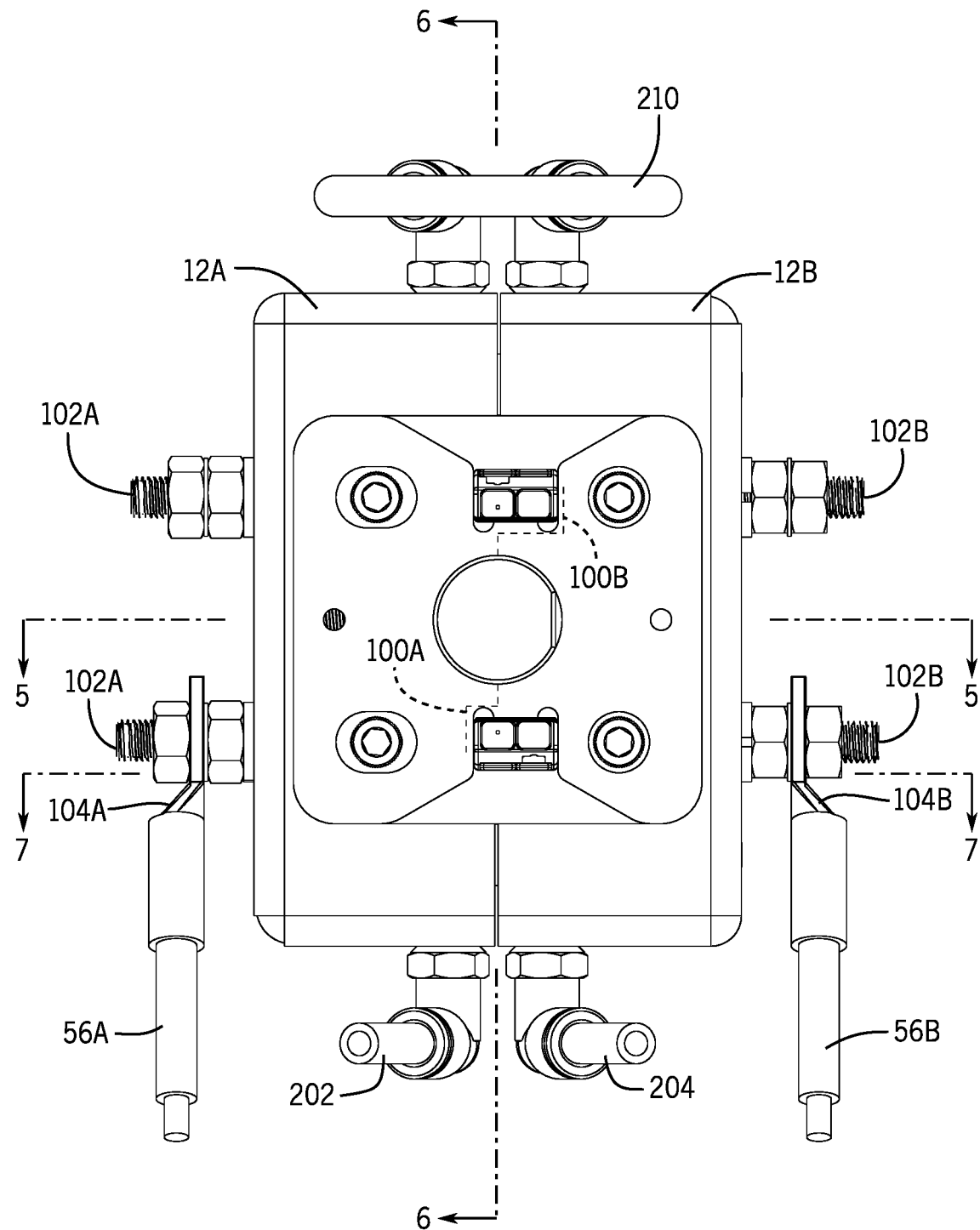
FIG. 3 is a top plan view of the heat-seal tool of FIG. 2.

Referring now to FIG. 3, tab terminal 100A is defined on bus bar 12A and tab terminal 100B is defined on bus bar 12B. The tab terminals 100A, 100B are offset with respect to each other so that each conductive tab 80A, 80B (FIG. 2) of heat-seal band 50 can only electrically communicate with one of the tab terminals 100A, 100B. A lug terminal 102A extends from bus bar 12A and a lug terminal 102B extends from bus bar 12B. The lug terminals 102A, 102B are shown as threaded posts to which cable lugs 104A, 104B at the ends of conductors 56A, 56B are connected to electrically connect the conductors 56A, 56B to the respective bus bars 12A, 12B.

Figure 4:
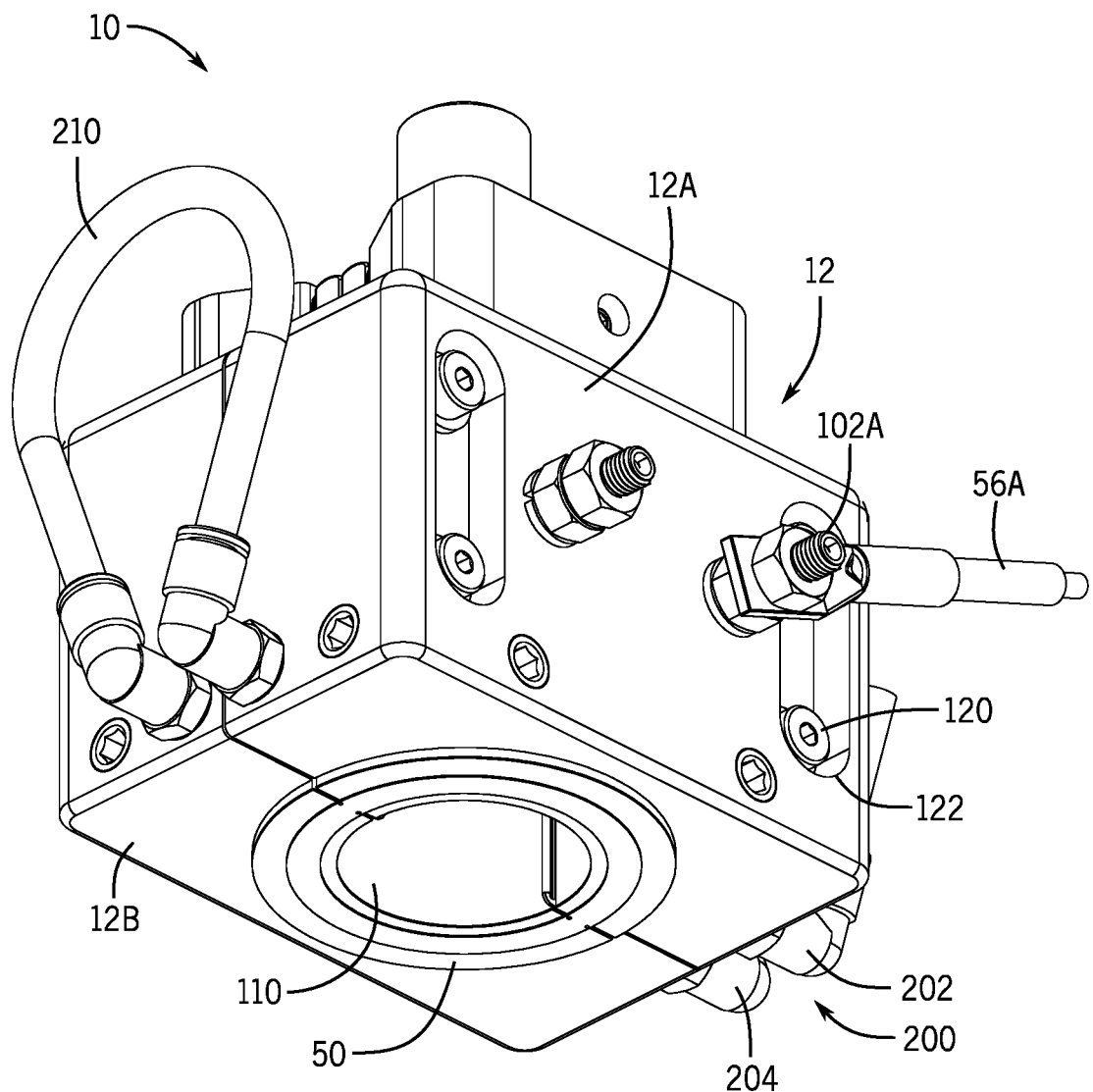
FIG. 4 is an isometric view of the heat-seal tool of FIG. 2.
Figure 5:
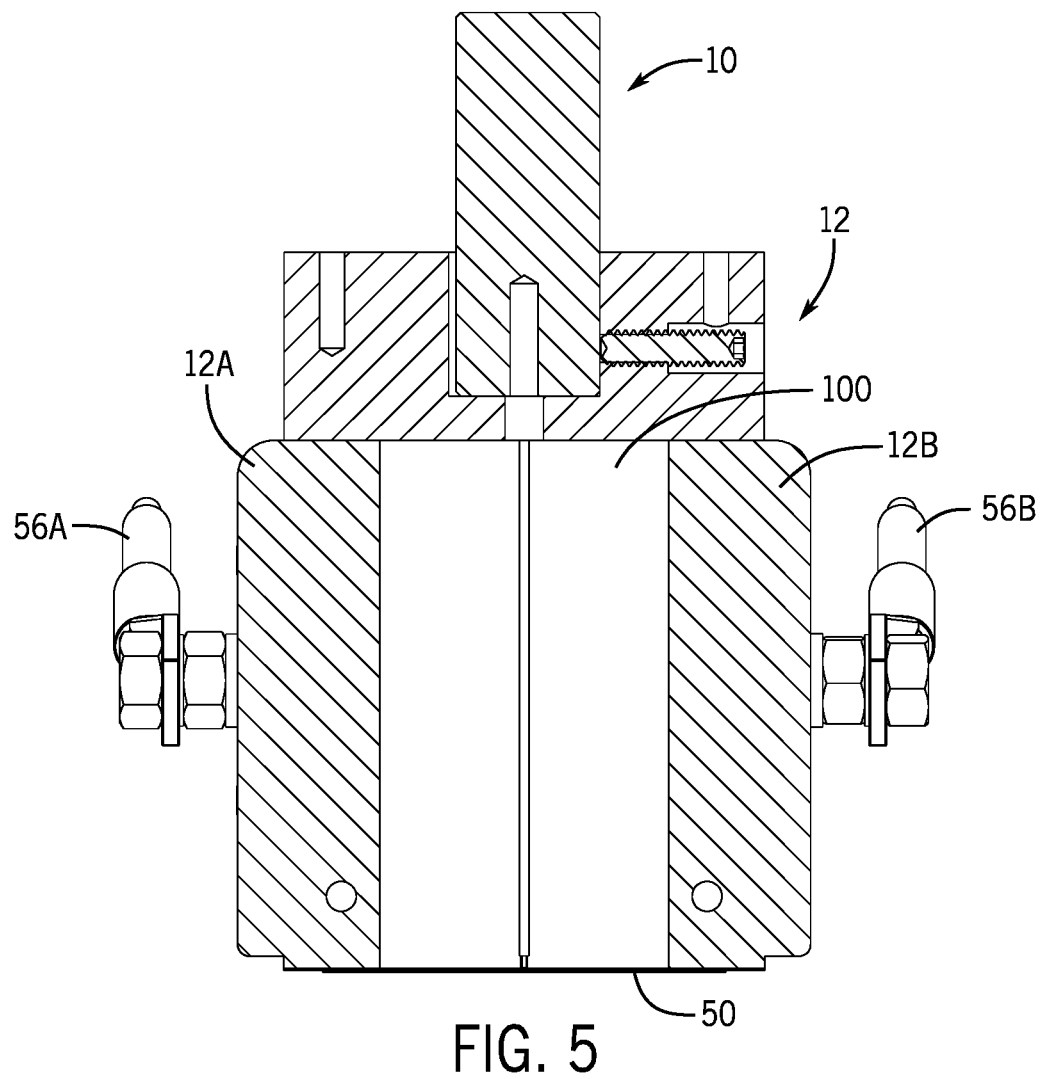
FIG. 5 is a cross-sectional view of the heat-seal tool of FIG. 2.
Figure 6:
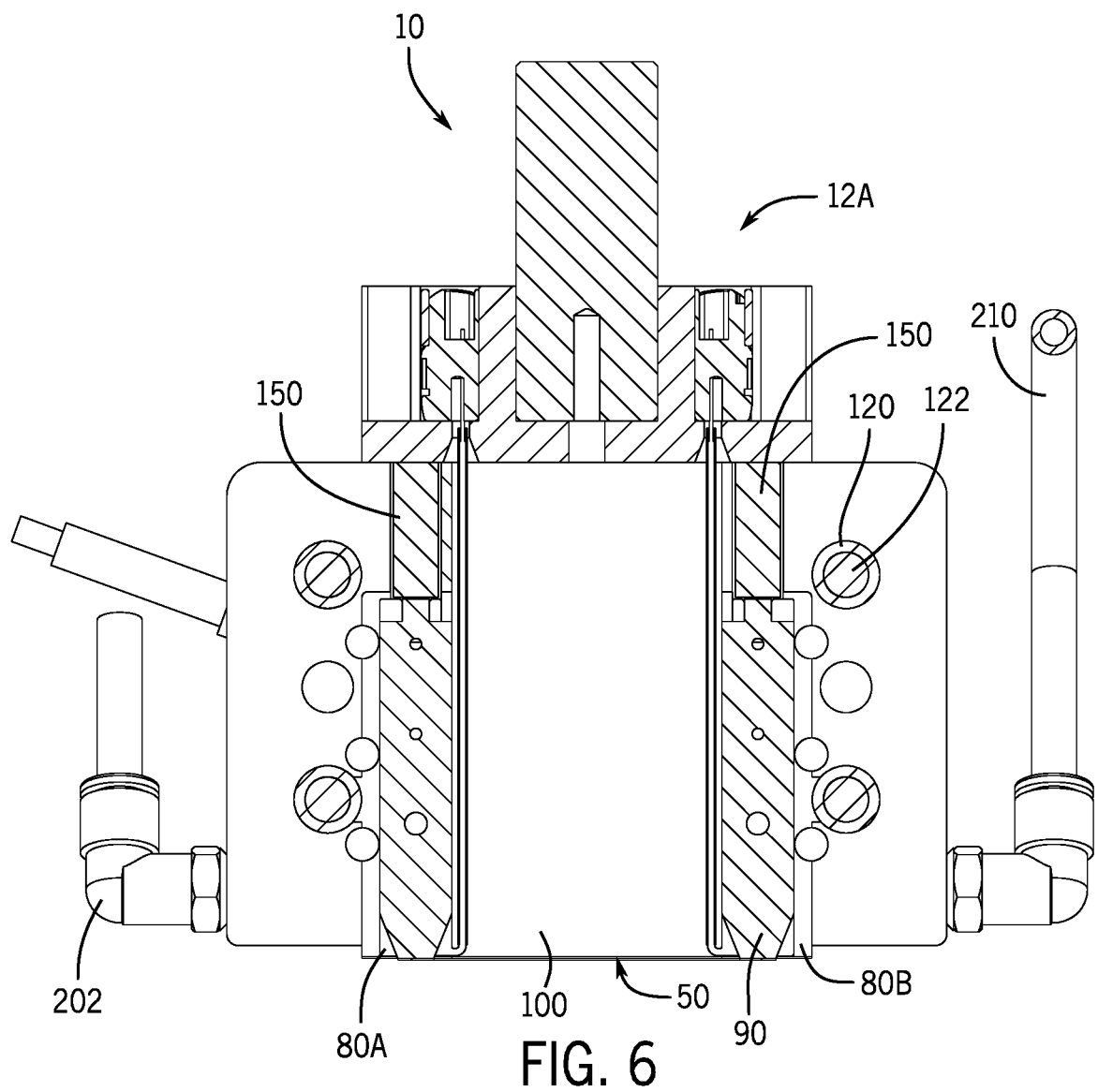
FIG. 6 is another cross-sectional view of the heat-seal tool of FIG. 2.

Referring now to FIGS. 4-6, each bus bar 12A, 12B has a trough or channel that is semi-circular in cross-section and extends upwardly along a central portion of its upright wall facing the other bus bar 12A, 12B. In the assembled bus bar assembly 12, The semi-circular channels collectively form a vertical bore or cylindrical tool cavity 110 through a central segment of the bus bar assembly 12. The tool cavity 110 provides a clearance that can receive a segment of a component being heat-sealed during the heat-sealing procedure and may further provide a routing path; along which, for example, voltage sensing wires of the heat-seal band 50 may extend. As shown in FIG. 4, the bus bars 12A, 12B are held against each other by fasteners, such as tie bolts 120 that clamp the bus bars 12A, 12B and the against each other, sandwiching the tabs 80A, 80B of the heat-seal band 50 between them. Tie bolt insulators 122 are sleeves made from insulating materials that extend through aligned bores in the bus bars 12A, 12B and electrically insulate the tie bolts 120 from the bus bars 12A, 12B.

Referring now to FIG. 6, replacing heat-seal band 50 with another heat-seal band 50 can be facilitated with biasing members, shown as springs 150. Springs 150 are typically implemented as non-conductive compression springs, such as silicone springs or other elastomeric structures. The springs 150 are arranged in the tool 10 in a manner that can eject the heat-seal band 50 away from its in-use seated or retracted position to an extended position during a heat-seal band removal procedure, which may include loosening the clamped engagement of the bus bars 12A, 12B with respect to each other. The springs 150 engage portions of the heat-seal band 50 that are held within the tool 10, such as upper ends of the conductive tabs 80A, 80B and/or gap gauges 90, which push upwardly against the springs 150. This compresses the springs 150 when the bus bars 12A, 12B are clamped to each other to hold the heat-seal band 50 in its seated position. When the springs 150 are in their compressed state, they hold energy that is released to push the heat-seal band 50 away from the bottom of the bus bar assembly 12 during the heat-seal band removal procedure.

Figure 7:
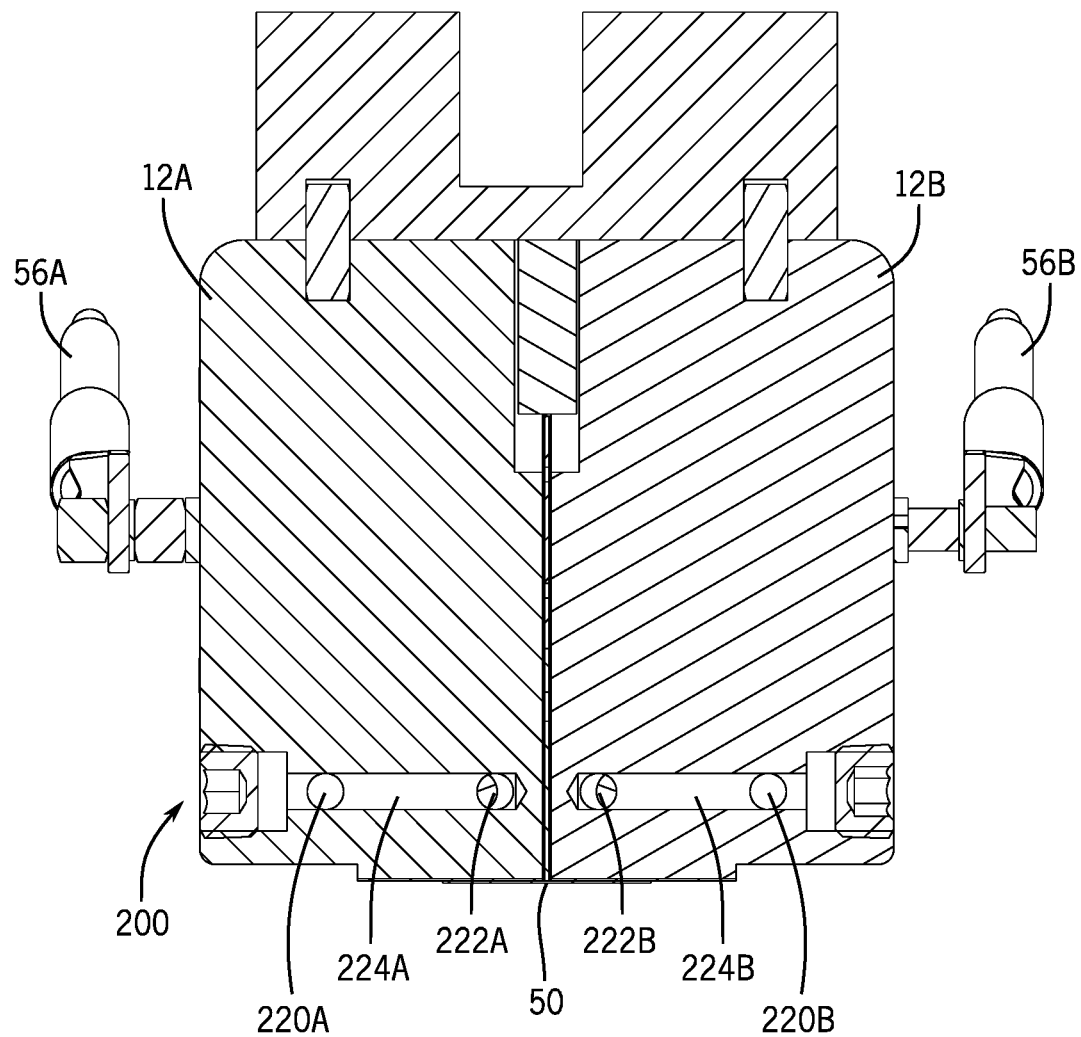
FIG. 7 is another cross-sectional view of the heat-seal tool of FIG. 2.

Referring now to FIGS. 4 and 7, a cooling system 200 is configured to internally cool the heat-seal tool 10 to, for example, cool the workpiece 30 (FIG. 1). This cooling may be done during a cooling/pressure application phase of the heat-sealing procedures and/or to provide a temperature differential to enhance control of the heat-seal band's 50 heating by providing a cooling component or load against heating component or load during the heating of heat-seal band 50 during the heat-sealing procedure. FIG. 4 shows plumbing-type components that convey the cooling fluid, which may be a gas or liquid. In this example, the cooling fluid flows through both the bus bars 12A, 12B, in series. Inlet and outlet tubes 202, 204 are connected to the bus bars 12A, 12B at one side of the tool 10 to receive fluid from and return fluid to pumping and cooling components of the cooling system 200. A connector tube 210 connects a fluid outlet of bus bar 12A to a fluid inlet of bus bar 12B, which allows a volume of cooling fluid to flow through both of the bus bars 12A, 12B. FIG. 7 shows interconnected cooling ducts or passages that define a coolant flow path within tool 10. Outer passages 220A, 220B are arranged outwardly of the heat-seal band 50 and inner passages 222A, 222B are arranged toward the seam between the bus bars 12A, 12B, above the band 70 of heat-seal band 50. A cross-passage 224A connects the outer and inner passages 220A, 222A to each other and a cross-passage 224B connects the outer and inner passages 220B, 222B to each other.

In some implementations, instead of incorporating connector tube 210, cooling system 200 separately cools the bus bars 12A, 12B as a pair of self-contained cooling arrangements or separate cooling systems. Each of the bus bars 12A, 12B has its own cooling loop of at least one passage that conveys its own cooling fluid, along with corresponding inlets and outlets that connect it to cooperating cooling system 200 components.

Figure 8:
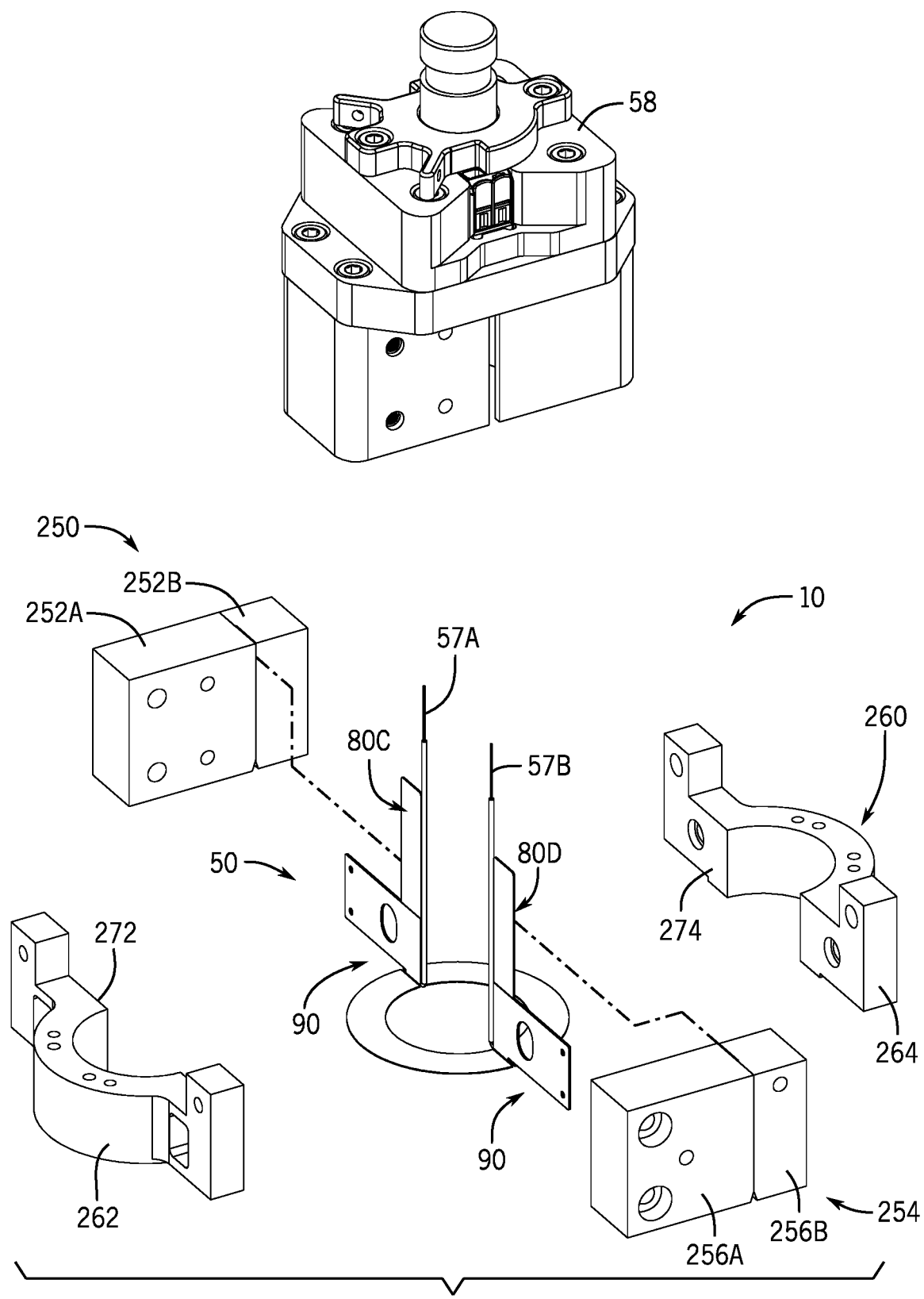
FIG. 8 is a partially exploded isometric view of another heat-seal tool in accordance with various aspects of the invention.

Referring now to FIG. 8, the heat-seal band 50 and heat-sealing tool 10 differ from those shown in, e.g., FIG. 2 in the following ways. Compared to the generally linear or rectangular tabs 80A, 80B of FIG. 2, heat-seal band's 50 tabs 80C, 80D shown in FIG. 8 have L-shaped configurations. The tab cover system is shown with gap gauges 90 in a horizontal orientation or arranged generally perpendicularly with respect those shown in FIG. 2. Compared to that shown in FIG. 2, heat-sealing tool 10 of FIG. 8 has additional segmented components or features that are configured to separate various aspects of transmitting load current to and holding of the heat-seal band 50. Each bus bar is further segmented to clamp a respective portion of tab 80C, 80D for electrical connector-type engagement, shown as corresponding load current clamps that may, themselves, be segmented to clamp against respective upper portions of tabs 80C, 80D. A first load current clamp 250 includes load current clamp segments 252A, 252B that are configured to clamp against the upper portion of tab 80C. At the other side of the heat-seal band 50, a second load current clamp 254 includes load current clamp segments 256A, 256B that are shown configured to clamp against an upper portion of tab 80D. The paired load current clamp segments 252A, 252B and 256A, 256B of the load current clamps 250, 254 provide respective electrical terminals or connections between the tabs 80C, 80D and load lines or conductors 56A, 56B (FIG. 1).

Still referring to FIG. 8, heat-sealing tool 10 is shown with a multi-component or segmented band body holder or holder clamp 260, with a pair of holder clamp segments 262, 264. The holder clamp segments 262, 264 may be electrically insulated or electrically nonconductive and also thermally conductive. Holder clamp 260 is shown here configured to clamp against and retain lower portions of heat-seal band 10, such as the lower horizontally oriented segments of L-shaped tabs 80C, 80D, as shown. In this way, respective inwardly facing surfaces of the holder clamp segments 262, 264 may present electrically nonconductive or insulated surfaces 272, 274 that face each other and respective surfaces of the tabs 80C, 80D. Such electrically insulated surfaces 272, 274 may be implemented as hard anodized coatings. Respective portions of the tabs 80C, 80D, shown here as lower portions, are sandwiched between the holder clamp segments 262, 264 to provide engagements that thermally but do not electrically conduct between the tabs 80C, 80D and holder clamp 260. It is understood that cooling system 200 (FIGS. 4, 7) may be implemented with, e.g., holder clamp 260 with cooling loops and/or other passages that extend through the holder clamp segments 262, 264 either separately or in combined, along the lines described about with reference to FIGS. 4 and 7.

Other aspects and characteristics of a heat-seal tool 10 falling within the scope of the present invention are disclosed in the drawings attached hereto, the disclosure of which is expressly incorporated herein.

Many changes and modifications could be made to the invention without departing from the spirit thereof. The scope of these changes will become apparent from the appended claims.

What is claimed is:

1. A heat-seal tool for providing electrical energy to a heat-seal band, the heat-seal tool comprising:
   a first bus bar toward a first segment of the heat-seal band that electrically connects a first load current conductor to a first tab of the heat-seal band;
   a second bus bar toward a second segment of the heat-seal band that electrically connects a second load current conductor to a second tab of the heat-seal band;
   a clamp configured to hold the heat-seal band, the clamp including:
      a first clamp segment that presents a first electrically insulated surface toward the first tab of the heat-seal band;
      a second clamp segment that presents a second electrically insulated surface toward the second tab of the heat-seal band; and
      an abutment joint defined by face-to-face engagements of respective surfaces of:
         the first clamp segment and the first tab; and
         the second clamp segment and the second tab.

2. The heat-seal tool of claim 1, wherein lower portions of each of the first and second tabs of the heat-seal band are sandwiched between the first and second clamp segments.

3. The heat-seal tool of claim 2, wherein
   the clamp defines a holder clamp that is both electrically insulated and thermally conductive with respect to the first and second tabs of the heat-sealing band;
   the first bus bar defines a first load current clamp that engages the first tab of the heat-sealing band; and
   the second bus bar defines a second load current clamp that engages the second tab of the heat-sealing band.

4. The heat-seal tool of claim 2, wherein
   the first load current clamp includes a first pair of load current clamp segments that sandwich the first tab of the heat-sealing band for electrical conduction;
   the second load current clamp includes a second pair of load current clamp segments that sandwich the second tab of the heat-sealing band for electrical conduction; and
   each of the first and second load current clamps is electrically insulated with respect to the holder clamp.

5. The heat-seal tool of claim 1, wherein
   the first bus bar is defined by the first clamp segment; and
   the second bus bar is defined by the second clamp segment.

6. The heat-seal tool of claim 1, wherein each of the first and second clamp segments includes an insulated surface that face toward each other.

7. The heat-seal tool of claim 6, wherein the abutment joint is defined by a face-to-face engagement of the insulated surfaces of the first and second clamp segments.

8. The heat-seal tool of claim 7, wherein the insulated surfaces of the first and second clamp segments are both electrically insulated and thermally conductive.

9. The heat-seal tool of claim 8, wherein the insulated surfaces of the first and second clamp segments are defined by an anodized material.

10. The heat-seal tool of claim 7, further comprising:
    a first tab terminal is defined by a first zone of exposed conductive material at the first clamp segment;
    the first tab terminal electrically engages the first tab of the heat-seal band;
    a second tab terminal is defined by a second zone of exposed conductive material at the second clamp segment; and
    the second tab terminal electrically engages the second tab of the heat-seal band.

11. The heat-seal tool of claim 1, further comprising at least one biasing member arranged in the heat-seal tool to eject the heat-seal band from an in-use position to an extended position during a heat-seal band removal procedure.

12. A heat-seal tool comprising:
    a first bus bar that is electrically connected to a first load current conductor;
    a second bus bar that is electrically connected to a second load current conductor; and
    a cooling system that is configured to convey a cooling fluid through at least one of the first and second bus bars.

13. The heat-seal tool of claim 12, wherein;
    the cooling system includes cooling passages that extend through each of the first and second bus bars;
    the cooling passages of the first and second bus bars are connected to each other.

14. The heat-seal tool of claim 12, wherein the cooling system is configured to separately cool the first and second bus bars and includes:
    a first cooling loop that extends through the first bus bar and conveys a first volume of cooling fluid for cooling the first bus bar; and
    a second cooling loop that extends through the second bus bar and conveys a second volume of cooling fluid for cooling the second bus bar.

15. The heat-seal tool of claim 1, wherein:
    lower portions of each of the first and second tabs of the heat-seal band are sandwiched between the first and second clamp segments; and
    the heat-seal tool includes a liquid cooling system configured for cooling the first and second clamp segments.

* * * * *